United States Patent
Park et al.

(10) Patent No.: US 8,613,238 B2
(45) Date of Patent: Dec. 24, 2013

(54) CONTROL KNOB FOR VEHICLE

(75) Inventors: Joon Young Park, Seongnam-si (KR); Chang Hyun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 13/559,086

(22) Filed: Jul. 26, 2012

(65) Prior Publication Data

US 2013/0145896 A1  Jun. 13, 2013

(30) Foreign Application Priority Data

Dec. 7, 2011 (KR) .................. 10-2011-0130203

(51) Int. Cl.
*G05G 1/02* (2006.01)
*G05G 1/08* (2006.01)

(52) U.S. Cl.
CPC . *G05G 1/08* (2013.01); *G05G 1/087* (2013.01)
USPC .......... 74/553; 74/523; 74/543; 362/487

(58) Field of Classification Search
USPC ........ 74/553, 523, 543, 544, 519, 558, 558.5; 116/28.1
See application file for complete search history.

(56) References Cited

U.S. PATENT DOCUMENTS

| | | | | |
|---|---|---|---|---|
| 2,096,190 A | * | 10/1937 | Moeller | 362/491 |
| 2,582,895 A | * | 1/1952 | Young | 74/745 |
| 5,993,019 A | * | 11/1999 | Kline et al. | 362/29 |
| 6,058,797 A | * | 5/2000 | Konig et al. | 74/523 |
| 6,834,987 B2 | * | 12/2004 | Zynda | 362/487 |
| 2006/0096406 A1 | * | 5/2006 | Liu | 74/543 |

FOREIGN PATENT DOCUMENTS

| | | |
|---|---|---|
| JP | 3557111 B2 | 5/2004 |
| JP | 2010-94869 A | 4/2010 |
| KR | 10-2009-0112779 A | 10/2009 |

* cited by examiner

*Primary Examiner* — Richard W Ridley
*Assistant Examiner* — William Santosa
(74) *Attorney, Agent, or Firm* — Morgan, Lewis & Bockius LLP

(57) ABSTRACT

A control knob for a vehicle has an improved outward appearance by forming a boundary line between two different materials in a portion that is not visible and preventing abrupt differences in color due to light refraction. The control knob is produced by dual injection molding of two different materials, is installed on one end of a shift lever, and functions as a handgrip. The control knob includes an portion of opaque and transparent materials, an overlapping portion opaque and transparent materials, and a coated portion formed of paint applied to portions of the transparent portion that do not overlap with the opaque portion. A boundary surface between the opaque and transparent portions is such that a refractive index of light passing through the transparent portion from the overlapping portion is close to a refractive index of light passing through the transparent portion from the coated portion.

5 Claims, 5 Drawing Sheets

CONTROL KNOB FOR VEHICLE

CROSS-REFERENCE TO RELATED APPLICATION

The present application claims priority of Korean Patent Application Number 10-2011-0130203 filed Dec. 7, 2011, the entire contents of which application is incorporated herein for all purposes by this reference.

BACKGROUND OF INVENTION

1. Field of Invention

The present invention relates to a control knob for a vehicle, and more particularly, to a control knob for a vehicle, with an improved outward appearance.

2. Description of Related Art

In general, a vehicle is equipped with a shift lever to select each gear. Further, when the shift lever is manipulated by a driver, a selecting cable and a shifting cable connected to the bottom of the shift lever are moved in connection to perform selecting and shifting of gears.

A control knob is installed on the shift lever. Here, the control knob denotes a handgrip installed on the end of the shift lever. Further, the control knob is formed to improve the grip feel of the shift lever. Moreover, as a decorative element inside a vehicle, the outward appearance of a control knob is important.

A control knob may be produced by applying dual injection molding according to the intent of the producer. Here, dual injection molding is a forming method in which two materials are used to produce an integrally and/or monolithically formed item. In such dual injection molding, a mold designed to be capable of dual injection molding is used which uses an injection molding machine with a structure in which two injection molding devices, a rotating device installed on a moving plate, and a core or a slide structure are used. Further, one material is injected in a primary cavity, and another material is injected into a secondary cavity to produce a formed item in which two materials are integrally formed.

In dual injection molding, because the primary cavity and the secondary cavity are precisely replaced, there are few restrictions as to the shape and the range of products to which the process may be applied. As described above, two materials are simultaneously extruded in dual injection molding. Accordingly, costs may be reduced and designs may be diversified when compared to a related art forming method which requires that two components are formed through two extrusion processes, followed by secondary processing such as bonding or painting.

However, for a control knob produced by dual injection molding, a boundary line may be formed between two different materials or an abrupt change in color may occur, which may deteriorate the outward appearance of the control knob.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a control knob for a vehicle having the advantages of an improved outward appearance.

Various aspects of the present invention provide for a control knob for a vehicle, which is produced by dual injection molding of two different materials, is installed on one end of a shift lever, and functions as a handgrip, the control knob including an opaque portion formed of an opaque material which is one of the two materials, a transparent portion formed of a transparent material which is the other of the two materials, an overlapping portion at which the opaque portion and the transparent portion overlap, and a coated portion formed of paint applied to portions of the transparent portion that do not overlap with the opaque portion, wherein a boundary surface between the opaque portion and the transparent portion is formed in a slope such that a refractive index of light passing through the transparent portion from the overlapping portion is close to a refractive index of light passing through the transparent portion from the coated portion.

The overlapping portion may be formed by a portion of a top surface of the opaque portion overlapping a portion of an undersurface of the transparent portion.

A boundary line formed to be externally exposed by the boundary surface may be formed at a side surface of the overlapping portion.

The coated portion may be formed on an undersurface of the transparent portion.

The boundary surface between the opaque portion and the transparent portion may be formed sloped as a gradually curved surface.

The boundary surface between the opaque portion and the transparent portion may be formed in a slope, such that a thickness of the transparent portion from the overlapping portion gradually changes along the boundary surface.

As described above, according to various aspects of the present invention, a boundary line between two different materials may be formed in a portion that is not visible. Further, abrupt differences in color due to light refraction may be prevented. Thus, it is possible to improve the outward appearance. In addition, customer satisfaction may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
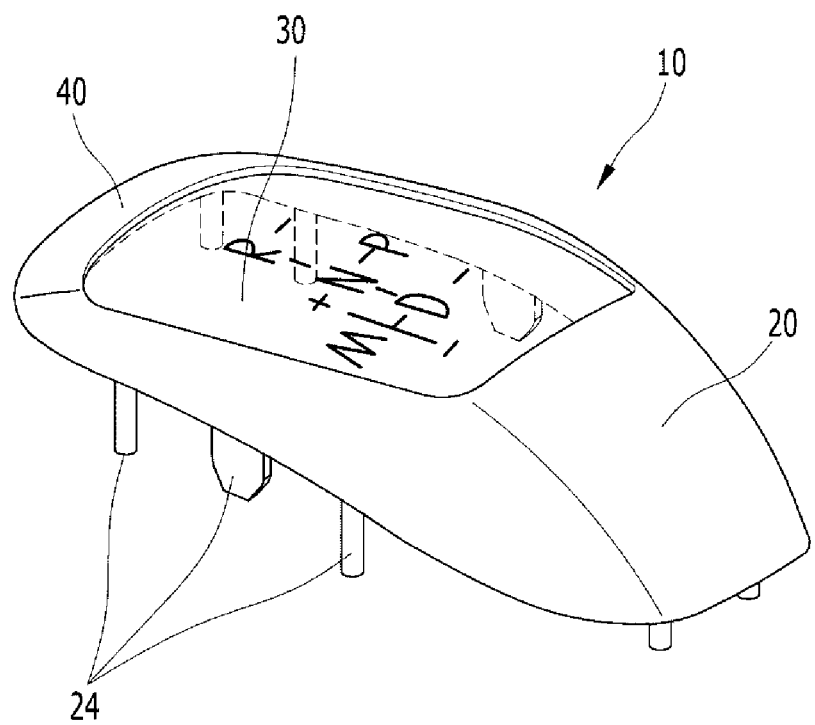
FIG. 1 is a perspective view of an exemplary control knob for a vehicle according to the present invention.

FIG. 1 is a perspective view of a control knob for a vehicle according to various embodiments of the present invention. Further, FIG. 2 is a top plan view of a control knob for a vehicle according to various embodiments of the present invention.

Figure 2:
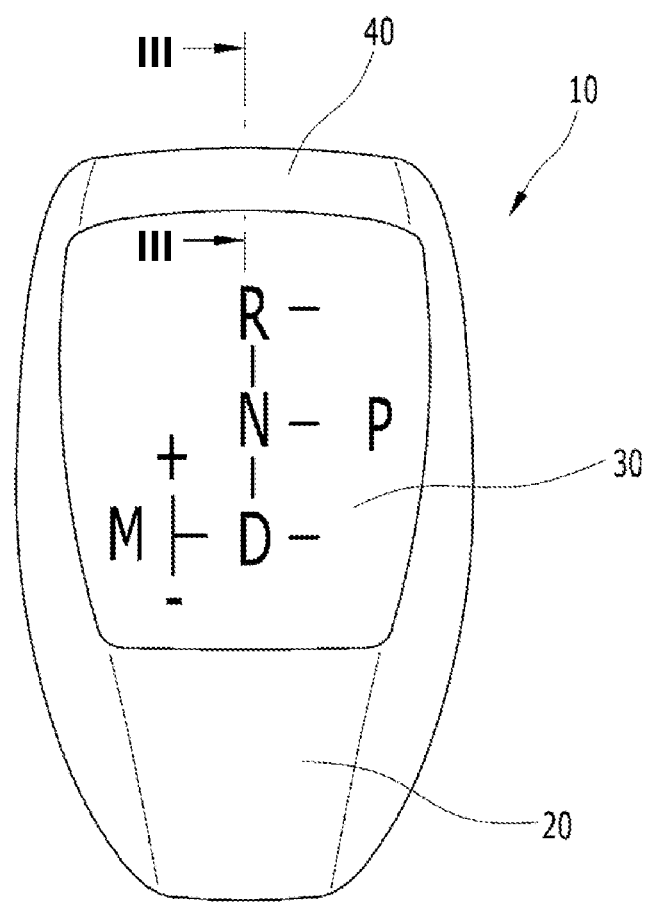
FIG. 2 is a top plan view of an exemplary control knob for a vehicle according to the present invention.

Referring to FIGS. 1 and 2, a control knob 10 includes an opaque portion 20, a transparent portion 30 and an overlapping portion 40. Further, the opaque portion 20 and the transparent portion 30 are integrally formed through dual injection molding. Here, dual injection molding is a forming method that uses two different materials to produce an integrally and/or monolithically formed item, a method that is otherwise conventional, so that a detailed description thereof will not be provided.

In various embodiments of the present invention, one opaque material and one transparent material are used as the two different materials.

The opaque portion 20 is formed of the opaque material. Further, the opaque portion 20 may be formed in a curved plate shape so as to improve grip feel for a driver. In addition, a portion of the plate of the opaque portion 20 is formed as an empty space.

A plurality of coupling protrusions 24 is formed on the undersurface of the opaque portion 20. Further, the coupling protrusions 24 are formed so as to couple the control knob 10 to a shift lever. Specifically, the shift lever may receive the coupling protrusions 24 so as to be coupled.

The transparent portion 30 is formed of the transparent material. Further, the transparent portion 30 is formed in the empty space and is formed in a single curved shape together with the opaque portion 20. In addition, text, a drawing, etc. may be applied to the transparent portion to show a gear pattern or display a design. A paint of the same color as the opaque portion 20 may be applied to the transparent portion 30.

An overlapping portion 40 is a portion in which the opaque portion 20 and the transparent portion 30 are stacked and overlapped. Further, the overlapping portion 40 is formed where a portion of the top surface of the opaque portion 20 contacts a portion of the undersurface of the transparent portion 30. Therefore, a portion at which the boundary between the opaque portion 20 and the transparent portion 30 is externally exposed may be formed at a side surface.

Figure 3:
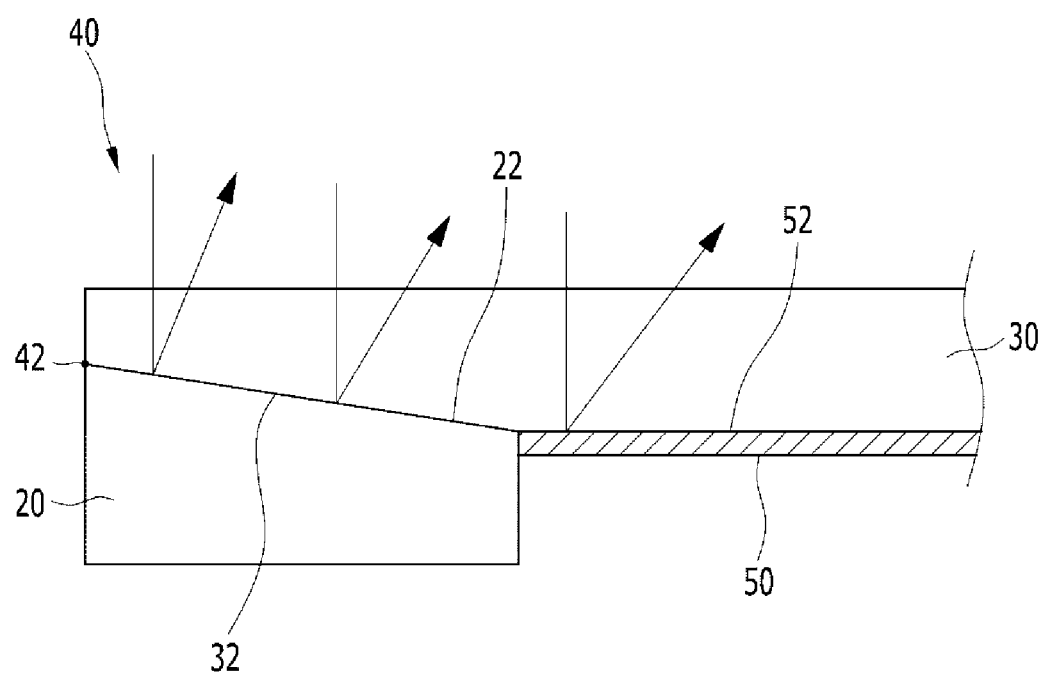
FIG. 3 is a cross-sectional view of an overlapping portion taken along III-III in FIG. 2 according to the present invention.

FIG. 3 is a cross-sectional view of an overlapping portion taken along III-III in FIG. 2 according to various embodiments of the present invention.

Figure 4:
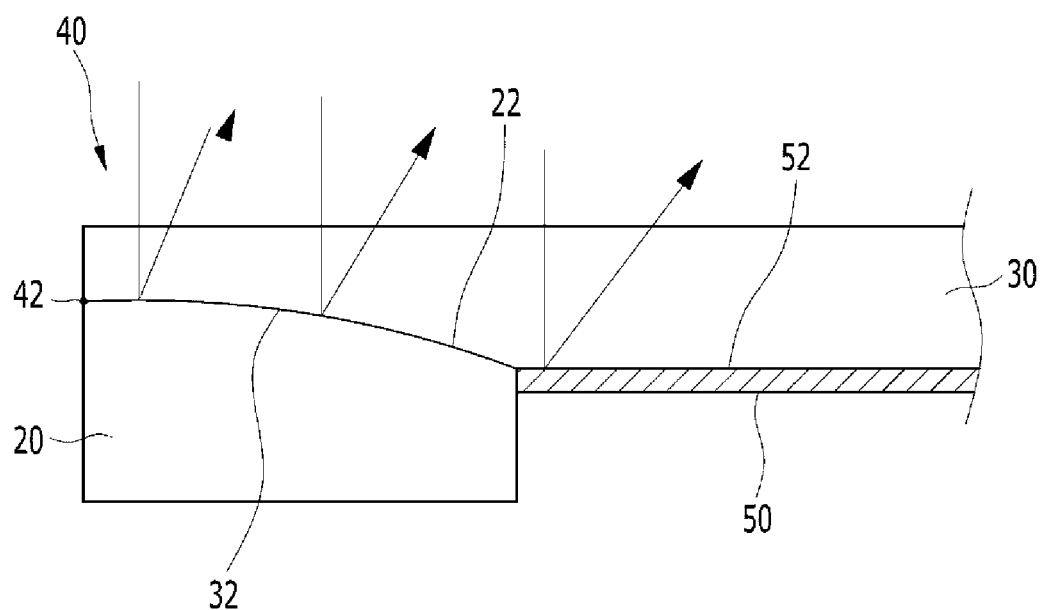
FIG. 4 is a cross-sectional view of an overlapping portion similar to that of FIG. 3 according to the present invention.

FIG. 4 is a cross-sectional view of an overlapping portion similar to that of FIG. 3 according to various embodiments of the present invention.

The opaque boundary surface 22 is the top surface of the opaque portion 20 at the overlapping portion 40. Further, the transparent boundary surface 32 is the undersurface of the transparent portion 30 at the overlapping portion 40. Thus, the opaque boundary surface 22 and the transparent boundary surface 32 contact to form the overlapping portion 40. The opaque boundary surface 22 and the transparent boundary surface 32 may be formed in mutually corresponding shapes.

The boundary line 42 is a portion at which the boundary between the opaque portion 20 and the transparent portion 30 is externally exposed. Further, the boundary line 42 is formed at a side surface of the overlapping portion 40 at which the opaque boundary surface 22 contacts the transparent boundary surface 32.

When this boundary line 42 is externally exposed, the outward appearance of the control knob 10 may be deteriorated. Further, when the boundary line 42 is exposed at the side surface of the control knob 10, the outward appearance may be improved over exposure at the top surface. In addition, when the boundary line 42 is formed at the side surface of the control knob 10, when the control knob 10 is coupled with the shift lever, the boundary line 42 may be covered by a portion of the shift lever so as not to be visible.

FIG. 3 illustrates a coated portion 50 formed on the transparent portion 30 except for the overlapping portion 40.

A coated portion 50 is formed by paint being applied to a portion of the undersurface of the transparent portion 30 that is not the transparent boundary surface 32. Specifically, the coated portion 50 denotes a layer of paint having a certain thickness. Further, paint of the same color as the opaque portion 20 is used for the coated portion 50. The top surface of the coated portion 50 contacting the undersurface of the transparent portion 30 is a coated portion boundary surface 52. The transparent portion 30 contacting the coated portion 50 may be formed of a uniform thickness.

Figure 5:
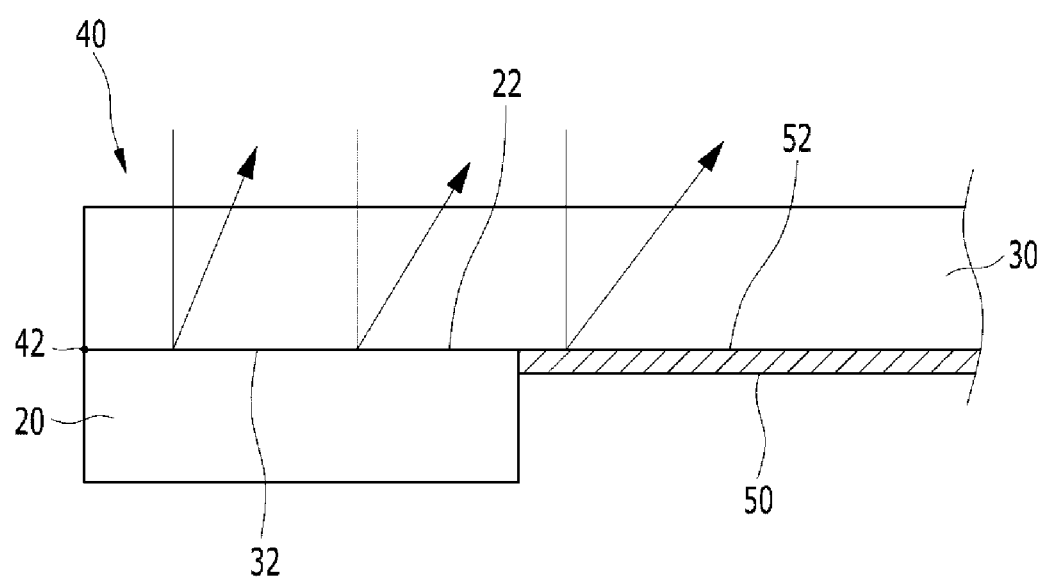
FIG. 5 is a diagram illustrating an exemplary case in which the thickness of a transparent portion forming an overlapping portion is uniform.

The arrows in FIGS. 3, 4, and 5 schematically illustrate the refraction of light. The color of the opaque portion 20 and the coated portion 50 may be perceived differently according to differences in the refractive indices of light. Further, because the materials of the opaque portion 20 and the coated portion 50 are different, the refractive indices thereof are different.

In various embodiments of the present invention, the opaque boundary surface 22 is formed in a slope in order to prevent colors from being perceived differently due to the difference in refractive indices of the opaque portion 20 and the coated portion 50. In addition, the opaque boundary surface 22 is formed in a downward slope in a direction from the boundary line 42 toward the coated portion 50. Further, the transparent boundary surface 32 is formed in a sloped shape corresponding to the opaque boundary surface 22.

FIG. 4 is a cross-sectional view of an overlapping portion viewed from direction A-A in FIG. 2 according to various embodiments of the present invention.

Hereinafter, the overlapping portion 40 according to various embodiments of the present invention will be described in detail with reference to FIG. 4. Further, repetitive descriptions of constituent elements in FIG. 4 that are the same as those in FIG. 3 will not be provided.

In various embodiments of the present invention, the opaque boundary surface 22 is formed as a gradually sloped surface in order to prevent colors from being perceived differently due to the difference in refractive indices of the opaque portion 20 and the coated portion 50. Further, the opaque boundary surface 22 is formed in a downward slope in a direction from the boundary line 42 toward the coated portion 50. The opaque boundary surface 22 may be formed as a convex curved surface. Further, the transparent boundary surface 32 is formed in a sloped shape corresponding to the opaque boundary surface 22.

One will appreciate that the shape of the opaque boundary surface 22 in FIGS. 3 and 4 may be modified and applied to prevent colors of the opaque portion 20 and the coated portion 50 from being perceived differently. That is, the thickness of the transparent portion 30 at the top of the opaque boundary surface 22 may be formed to gradually widen in a downward direction from the boundary line 42 toward the coated portion 50. In addition, the refractive index of light may be formed differently according to the thickness of the transparent portion 30. Therefore, an abrupt change in refractive index at the boundary between the opaque portion 20 and the coated portion 50 may be prevented.

FIG. 5 is a diagram illustrating a case in which the thickness of a transparent portion forming an overlapping portion is uniform.

When the thickness of the transparent portion 30 forming the overlapping portion 40 is formed uniformly, the refractive index of light at the boundary between the opaque portion 20 and the coated portion 50 changes abruptly. Accordingly, an abrupt change in color may be perceived between the opaque portion 20 and the coated portion 50.

As described above, according to various embodiments of the present invention, the boundary line 42 of two different materials is produced in a portion that is not visible. Further, an abrupt difference in color due to the refraction of light may be prevented. Therefore, outward appearance may be improved. In addition, customer satisfaction may be improved.

For convenience in explanation and accurate definition in the appended claims, the terms top, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control knob for a vehicle formed by dual injection molding of two different materials and installed on one end of a shift lever to function as a handgrip, the control knob comprising:
   an opaque portion formed of an opaque material which is one of the two materials;
   a transparent portion formed of a transparent material which is another of the two materials;
   an overlapping portion integrally formed by dual injection molding with the two different materials, at which the opaque portion is disposed underneath the transparent portion so that the transparent portion covers the opaque portion; and
   a coated portion formed of paint applied to portions of the transparent portion that do not overlap with the opaque portion;
   wherein a boundary surface between the opaque portion and the transparent portion is formed in a slope such that a refractive index of light passing through the transparent portion from the overlapping portion is close to a refractive index of light passing through the transparent portion from the coated portion, and a thickness of the covering transparent portion measured perpendicularly from the opaque portion at the overlapping portion changes gradually along the boundary surface.

2. The control knob of claim 1, wherein:
   the overlapping portion is formed by a portion of a top surface of the opaque portion overlapping a portion of an undersurface of the transparent portion.

3. The control knob of claim 1, wherein:
   a boundary line formed to be externally exposed by the boundary surface is formed at a side surface of the overlapping portion.

4. The control knob of claim 1, wherein:
   the coated portion is formed on an undersurface of the transparent portion.

5. The control knob of claim 1, wherein:
   the boundary surface between the opaque portion and the transparent portion is formed sloped as a gradually curved surface.

* * * * *